(12) United States Patent
Le-Faucheur

(10) Patent No.: US 8,179,235 B2
(45) Date of Patent: May 15, 2012

(54) TACTILE INTERFACE FOR MOBILE DEVICES

(75) Inventor: Laurent Le-Faucheur, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 545 days.

(21) Appl. No.: 12/486,663

(22) Filed: Jun. 17, 2009

(65) Prior Publication Data

US 2010/0315211 A1   Dec. 16, 2010

(30) Foreign Application Priority Data

Jun. 11, 2009  (EP) ..................................... 09290434

(51) Int. Cl.
*H04B 3/36* (2006.01)
*G08B 6/00* (2006.01)
*G09B 21/00* (2006.01)
*H03K 17/94* (2006.01)

(52) U.S. Cl. ................. 340/407.1; 340/407.2; 340/4.12; 341/27; 381/56; 367/199; 434/114; 434/116

(58) Field of Classification Search ............... 340/407.1, 340/407.2; 341/27
See application file for complete search history.

(56) References Cited

U.S. PATENT DOCUMENTS

| 3,479,026 | A | 11/1968 | Plummer |
| 7,592,901 | B2 * | 9/2009 | Furusho .................. 340/407.1 |
| 2006/0045304 | A1 | 3/2006 | Lee |
| 2008/0143496 | A1 * | 6/2008 | Linjama ................... 340/407.1 |
| 2008/0273013 | A1 * | 11/2008 | Levine et al. ................ 345/173 |

FOREIGN PATENT DOCUMENTS

WO   WO 2008/000304 A1   1/2008

OTHER PUBLICATIONS

H.P. Forghani-zadeh, et al., "Current-Sensing Techniques for DC-DC Converters", 0-7803-7523-8/02 IEEE, pp. II-577-II-580.
Nicolas Veau, Laurent Le-Faucheur, U.S. Appl. No. 12/367,232, "Sound Level Control", filed Feb. 6, 2009.

* cited by examiner

*Primary Examiner* — Donnie Crosland
(74) *Attorney, Agent, or Firm* — Ronald O. Neerings; Wade James Brady, III; Frederick J. Telecky, Jr.

(57) ABSTRACT

A tactile input to a system having a speaker located in an enclosure with an audio port can be detected by generating a sound wave in response to a signal and sensing the phase relationship between the current phase and the voltage phase of the signal. While the audio port is open a baseline current and voltage phase difference is established. When the audio port is obstructed by a finger touch, the current and voltage phase difference is altered in response to the obstruction. While the altered phase difference is detected, a tactile event is indicated.

20 Claims, 5 Drawing Sheets

TACTILE INTERFACE FOR MOBILE DEVICES

CLAIM OF PRIORITY

This application for Patent claims priority to European Patent Application No. EP 09 290 434.1 (attorney docket TI-67083EP) entitled "Tactile Interface for Mobile Devices" filed Jun. 11, 2009 and incorporated by reference herein.

FIELD OF THE INVENTION

This invention generally relates to the field of mobile devices, such as cellular handsets and personal, digital assistants, and in particular for playing games.

BACKGROUND OF THE INVENTION

Mobile audio devices are a ubiquitous fixture of modern society. Cellular telephones, personal music players, portable gaming systems, etc. are constant companions for many people. Cell phones continue to increase in computer processing capability and sophistication. The increased memory capacity and computing resources on a cell phone support the installation of various applications, often referred to as "apps" that allow a diverse range of functions to be performed by the cell phone when not being used for conversation.

For example, even when not talking, social networking can continue using various messaging tools and features. A wide circle of friends can be kept current with a twittering app. Shopping venues can be located and found using navigation apps that provide mapping and global positioning system (GPS) functionality. Various game apps use the keyboard and display to provide a range of gaming opportunities.

A cell phone typically has a speaker built into the handset body. Many handsets also have a connector to allow attachment of a mono or stereo headset that may be used for conversation with another person via the cellular network or for listening to music or other audio streams that are downloaded to the handset or are stored on the handset.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
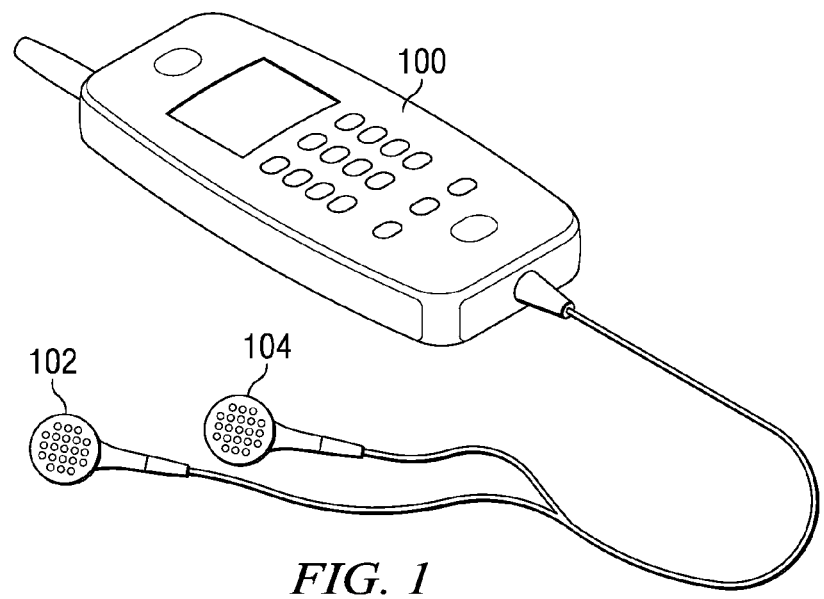
FIGS. 1 and 2 are exemplary images of a cell phone with stereo ear buds that embodies a tactile interface using the ear buds.
Figure 2:
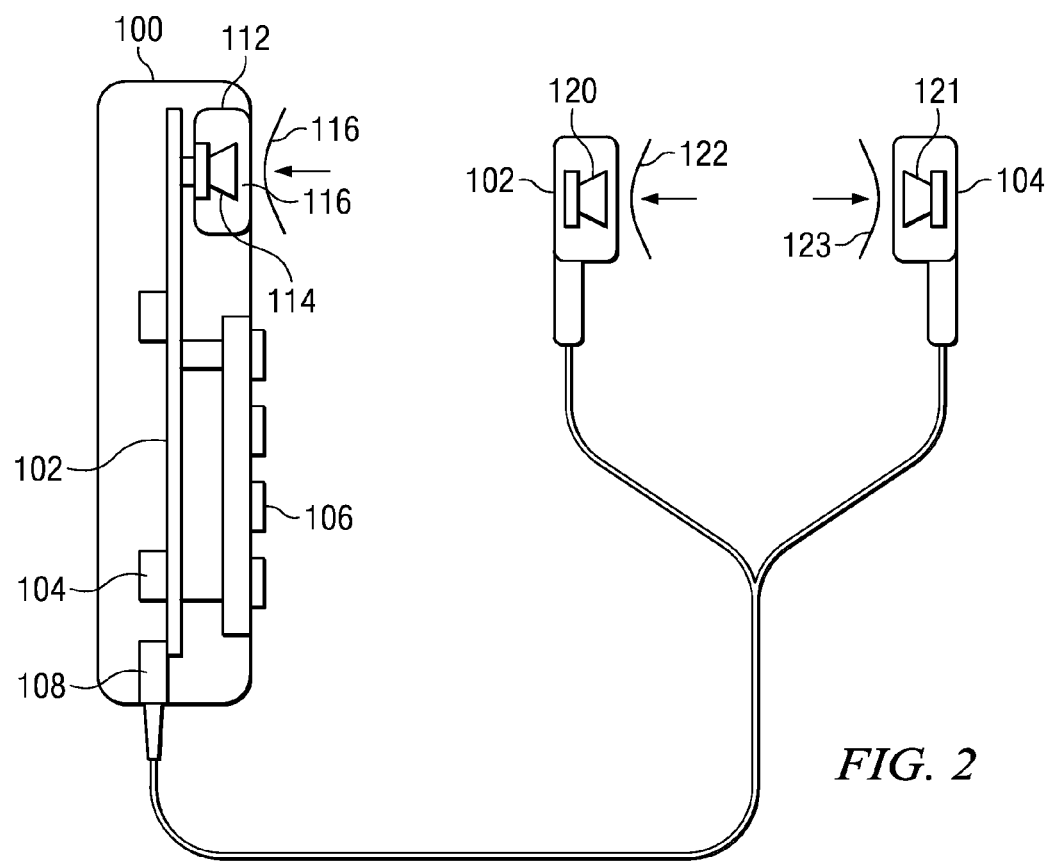

FIGS. 1 and 2 are exemplary images of a cell phone handset 100 with stereo ear buds 102, 104 that embodies a tactile interface using the earbuds. When a thumb or finger is pressed on the speakers of the earbuds this pressure can be detected by the handset. The handset generates a low level audio signal that is provided to the earbuds. A phase detector connected to the audio analog driver can observe a phase shift between the voltage and the current. This phase shift results from a variation of speaker impedance caused by a change in acoustic impedance. Covering the headset's loudspeaker enclosure results in a change in the acoustic impedance that is seen by the earbud; this results in a change in the complex impedance of the speaker in the earbud. The change in speaker impedance causes a detectable phase shift in the signal driving the earbud speaker.

Testing has demonstrated a phase shift of up to 20 degrees may occur between the current and voltage waveforms of the speaker signal due to variations in impedance of the speaker caused by variations in acoustic impedance experienced by the speaker. Such a shift can easily be detected.

Referring to FIG. 2, cell phone handset 100 includes a substrate 102, such as a printed circuit board, on which are assembled one or more integrated chips (IC) 104. A keyboard 106 is connected to the substrate. A speaker 114 is located in an enclosure 112 and has an audio port 116 in front of the speaker. Enclosure 112 may be a dedicated enclosure that encompasses only speaker 114 and any associated interconnect wires. Alternatively, enclosure 112 may encompass some or all of the other components, including substrate 102, within handset 100. Audio port 116 may be a single opening on the external surface of enclosure 112, or it may include multiple openings arranged in a pattern. Audio port 116 may include openings on both sides of handset 100, as is common with flip-phone style handsets.

Earbuds 102, 104 each include speaker 120, 121 respectively, within an enclosure of the earbud. An audio port is provided in front of each speaker as a hole or series of holes in the earbud case. The earbuds are connected to handset 100 via a cable that attaches to connector 108. An amplified audio signal is produced in IC 104 in response to the operation of the handset, as is commonly known. An audio signal is provided to speaker 114. When earbuds 102, 104 are connected to handset 100, an audio signal is provided to each of speakers 120, 121 from IC 104. Generally this is a stereo signal for music playback, but in some applications of the handset two different audio signals may be supplied to the two earbud speakers. While the earbuds are connected, body speaker 114 may or may not be cutoff, depending on the operating mode of the handset.

As will be described in more detail below, current and voltage sensing is applied to the audio signal(s) going to the active speakers. Phase shift detection between the current and voltage waves of the audio signal(s) is performed in IC 104. In one embodiment of handset 100, a user may use one or both earbuds as tactile input devices for an application such a game that requires user input. In response to the game app, IC 104 may send an audio signal that is a single tone, for example, that is reproduced by the speakers. By grasping the earbud, a user can either cover the audio port of each earbud with a finger or thumb, for example, as illustrated and 122, 123, or leave the audio port of each earbud open. In this manner, the acoustic impedance of each earbud and thereby the complex impedance of the speaker can be separately changed.

In another embodiment of handset 100, a user may use speaker 114 on the body of handset 100 as a tactile input device for an application such a game that requires user input. In response to the game app, IC 104 may send an audio signal that is a single tone, for example, that is reproduced by speaker 114. By grasping the handset, a user can cover the audio port 116 with a finger, thumb or palm, for example, as illustrated at 116, or leave the audio port of open. In this manner, the acoustic impedance and thereby the complex impedance of speaker 114 can be changed.

Acoustic impedance is a property of a sound conducting medium. Acoustic impedance depends on the geometry, stiffness, and density of the medium. Embodiments of the present disclosure measure the acoustic impedance in the near-field of a mobile audio device's loudspeaker. The measured acoustic impedance describes some characteristics of the loudspeaker's environment.

A free space configuration occurs when the user's finger is not in contact with the loudspeaker, and the loudspeaker sees the acoustic impedance of air. Temperature, moisture, and pressure are considered constant. The characteristic impedance of a medium, such as air, rock or water is a material property:

$$Z_0 = \rho \cdot c$$

where
$Z_0$ is the characteristic acoustic impedance ($[M \cdot L^{-2} \cdot T^{-1}]$; N·s/m³ or Pa·s/m)
$\rho$ is the density of the medium ($[M \cdot L^{-3}]$; kg m³), and
$c$ is the longitudinal wave speed or sound speed ($[L \cdot T^{-1}]$; m/s)

The characteristic impedance of air at room temperature is about 420 Pa·s/m. By comparison the sound speed and density of water are much higher.

A blocked or obstructed configuration occurs when the loudspeaker is obstructed by the user's finger, and the loudspeaker sees the acoustic impedance of essentially water, since a finger is over 90% water.

Figure 3:
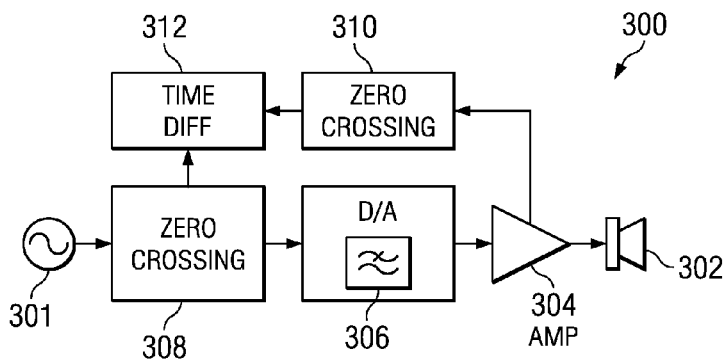
FIGS. 3 and 4 are exemplary block diagrams illustrating embodiments for detecting phase differences in speaker signals.
Figure 4:
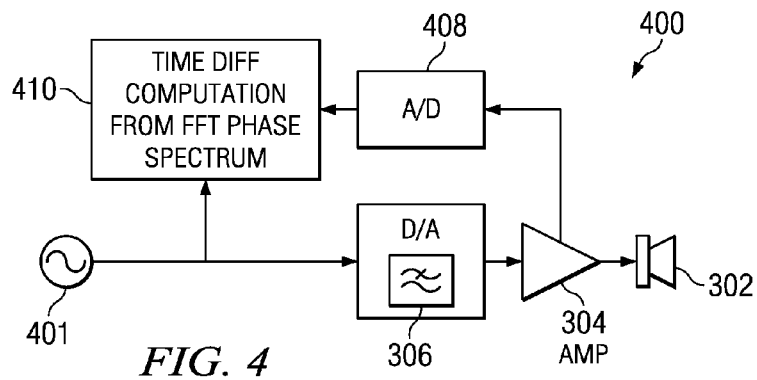

FIGS. 3 and 4 are exemplary block diagrams illustrating embodiments for detecting phase differences in speaker signals. In a first approximation, the speaker behaves dynamically as a second order mechanics system. The highest phase shift is observed on the resonant frequency which is in the range of 600 Hz-1500 Hz on small speakers in this embodiment.

In one embodiment, signal generator 301 produces a sine-wave with a frequency in this range. The signal generator may be embodied as a software routine executed by a processor within handset 100, for example. If the "sensing signal" is a sine-wave, then a zero-crossing scheme can be applied. A time difference between the voltage and current zero-crossing occurrence is used to determine the phase angle translated in a delay between zero-crossing.

Zero-crossing detector 308 determines the time of each zero-crossing of the digital signal produced by signal generator 301. The zero-crossing detector may also be embodied by a software routine executed on the processor. The signal is then converted to analog by digital-to-analog (D/A) converter 306, amplified by amplifier 304 and provided to speaker 302. Speaker 302 is representative of any of speakers 114, 120, 121 discussed above. The zero-crossing output of detector 308 also represents the time of zero-crossing for the voltage waveform applied to speaker 302 since propagation delay of the signal through amplifier 304 is negligible.

Current sensing logic within amplifier 304 then sends a signal representative of the current waveform to zero crossing detector 310 that determines the zero-crossing times of the current waveform. Zero-crossing detector 310 includes an analog-to-digital (A/D) converter so that further processing can be done in the digital domain by software executed on the processor. Time difference circuit 312 then compares the zero crossing times for the voltage signal from detector 308 and the zero-crossing times of the current waveform from detector 310 and determines a phase shift based on the time difference.

The sense signal does not necessarily need to be a sine-wave. A complex-FFT may be performed on voltage and current of a music file or other complex audio signal to extract a phase-shift. Referring to FIG. 4, signal generator 401 produces a complex audio signal. This may be white noise or a sound track associated with a game app that is using the tactile feedback interface, for example. A/D 408 converts the current signal detected in amplifier 304 to a digital representation. A phase spectrum of the voltage signal from generator 401 and a phase spectrum of the current signal from A/D 408 are then computed in Fast Fourier Transform (FFT) unit 410, which may be embodied by software executed by a processor within handset 100. Phase shift between the current and voltage can then be computed on each of the FFT taps. The FFT computes the phase shifts on all the taps from 0 Hz to 20 kHz. The phase shift estimation is done in the useful 600-1500 Hz band, but other frequencies may also be generated in the loudspeaker as part of the complex audio signal.

Table 1 illustrates a Matlab program computing voltage/current phase for a complex signal. The program illustrated in Table 1 demonstrated a phase difference error from theoretical of less than five degrees.

TABLE 1

Matlab program for voltage/current phase detection

```
% read an audio wave-file
    FFTL = 400; DATAL = 20000; M = 20;
    [data,FS,NBITS] = wavread('TEST_PHASE-MATLAB.wav');
    DATAL = size(input); DATAL=DATAL(1);
% filter it through a second-order filter to emulate the phase shift in the
current vs. voltage
    Fs = 48000; % Sampling Frequency
    N     = 2; Fpass1 = 10000; Fpass2 = 14000; Apass = 0.1; Astop = 12;
    [z,p,k] = ellip(N/2, Apass, Astop, [Fpass1 Fpass2]/(Fs/2));
    [sos_var,g] = zp2sos(z, p, k); Hd = dfilt.df2sos(sos_var, g);
    [b, a] = tf(Hd);
    c = [1 0 0 0 0 0 0 0 0 0 0 0 0 0 0 0 0 0 0 0 ];
    b = conv (b, c);
    data_f = filter (b,a, data);
% estimate the phase angle on each FFT taps by taking a sliding window
on every 20 samples
    xx = zeros(FFTL,1); nb = 0;
    for start=1:M:DATAL−FFTL
        buff   = data (start:start+FFTL−1);
        buff_f = data_f(start:start+FFTL−1);
        x = unwrap(angle(fft(buff))−angle(fft(buff_f)));
        x = x *360/pi; xx = xx − x; nb = nb+1;
    end
    xx = xx / nb; xx = xx − xx(1);
% plot the group-delay curve and check it matches with the theoretical one
from the filter.
    plot (xx(1:FFTL/2)); grid on
```

Figure 5:
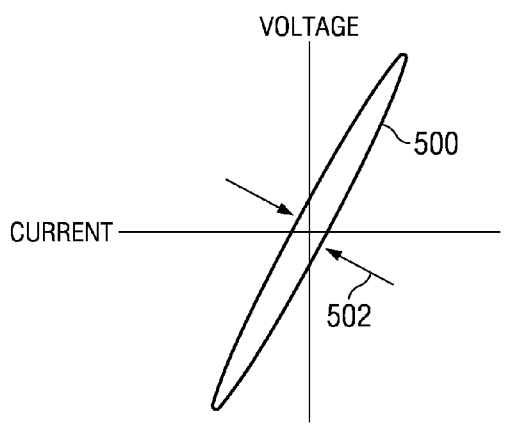
FIGS. 5 and 6 are Lissajou curves for an obstructed speaker and a free-air speaker, respectively.
Figure 6:
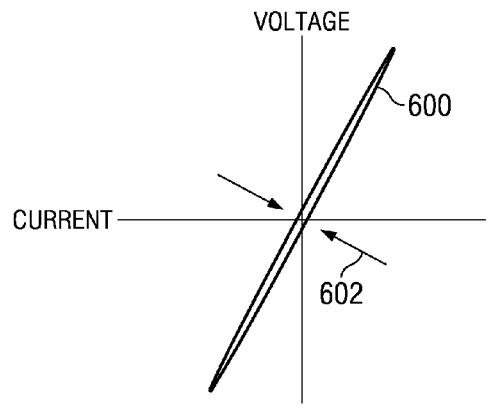

FIGS. 5 and 6 are Lissajou curves for an obstructed speaker and a free-air speaker, respectively. Notice how much larger the phase difference indicated at 502 for the obstructed speaker is compared to the phase difference indicated at 602 for the free-air speaker. This difference can be detected using the phase detection methods described above, for example. Other means for detecting phase difference are known and may also be used in other embodiments to provide a tactile interface using the speakers of a mobile device.

Figure 7:
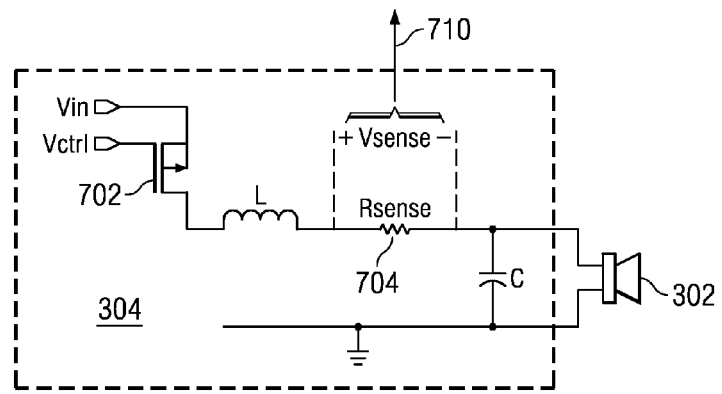
FIGS. 7 and 8 are schematics of current sensing logic.
Figure 8:
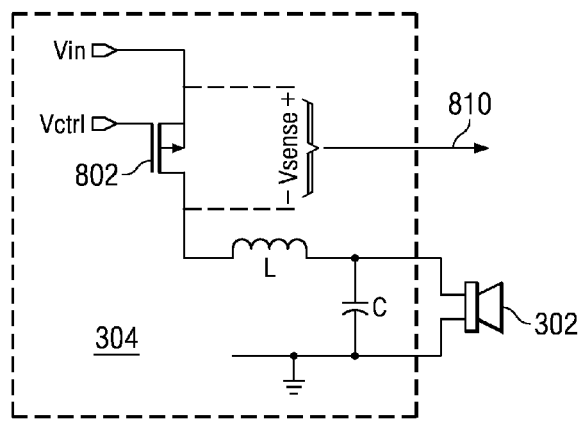

FIGS. 7 and 8 are schematics of different embodiments of current sensing logic. FIG. 7 illustrates one embodiment of current sensing logic in a portion of amplifier 304 in which a series sense resistor 704 is inserted in the signal path from output MOSFET 702 to speaker 302. A voltage across sense resistor 704 provides a signal 710 representative of the current flowing through speaker 302 that can be used by phase detection circuitry 312 or 410 to determine the phase shift between the current and voltage in the speaker signal. In another embodiment, current sensing resistor 704 may be placed in other places than within amplifier 304. For example, it may be encapsulated within speaker 302 or simply placed in the signal line between amplifier 304 and speaker 302.

FIG. 8 illustrates another embodiment of current sensing logic in a portion of amplifier 304. MOSFETs act as resistors when they are "on" and they are biased in the ohmic (non-saturated) region. Consequently, the current through a MOSFET may be determined by sensing the voltage across the drain-source ($V_{DS}$) Of a MOSFET, provided that $R_{DS}$ of the MOSFET is known. The main drawback of this technique is low accuracy. The drain to source resistance ($R_{DS}$) of the MOSFET is inherently nonlinear. Additionally, The $R_{DS}$ (for on-chip or discrete MOSFET) has significant process variation because of variation in semiconductor mobility, oxide capacitance and threshold voltage variation, not to mention how it varies across temperature, which may yield a total variance of −50% to 100%. The $R_{DS}$ depends exponentially on temperature. However, for purposes of determining phase difference, the accuracy of the current amplitude is not a factor.

In this embodiment, $V_{DS}$ of output driver MOSFET 802 is measured and provides a signal 810 representative of the current flowing through speaker 302 that can be used by phase detection circuitry 312 or 410 to determine the phase shift between the current and voltage in the speaker signal.

There are many other ways of performing current sensing, several of which are described in "Current-Sensing Techniques for DC-DC Converters," Hassan Pooya Forghani-zadeh, and Gabriel A. Rincon-Mora, Midwest Symposium on Circuits and Systems, 2002. For example, a current transformer may be used, a sense FET connected in parallel with the output MOSFET may be used, a current mirror may be used, etc.

Figure 9:
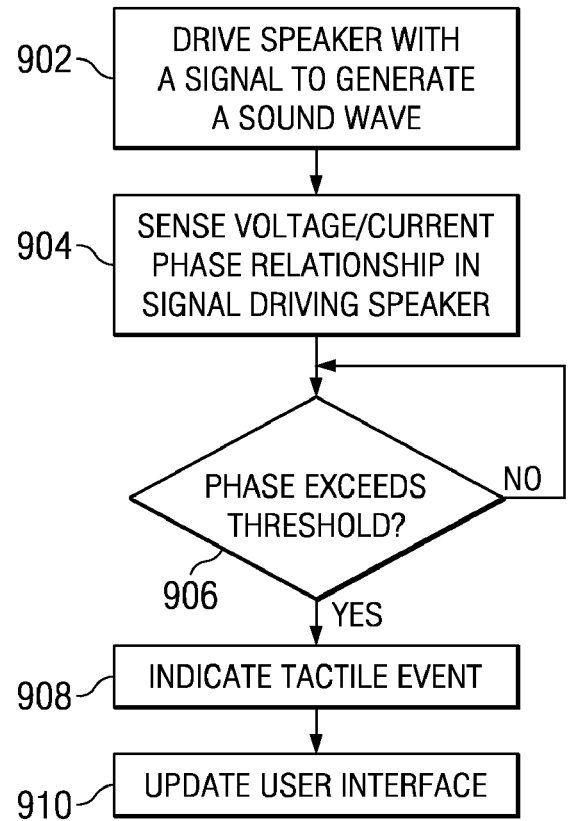
FIG. 9 is a flow diagram illustrating a method for detecting tactile input using a speaker.

FIG. 9 is a flow diagram illustrating a method for detecting tactile input using a speaker. A sound wave is generated 902 by the speaker in response to a signal having a voltage phase and a current phase. As discussed above, the current and voltage will be forced out of phase according to the complex impedance of the speaker.

While the speaker operates in open or free air, the difference in current and phase will be minimal, as illustrated in FIG. 6. This phase relationship can be sensed 904 as described above. If the phase difference is below a threshold value 906, then it is assumed that the speaker is operating in free air.

When a user wants to input a tactile event to the app that is being used, a finger or thumb, for example, is placed over the audio port of the speaker. As the operation environment of the speaker changes to a blocked configuration, the acoustic impedance is changed as described above which then causes the complex impedance of the speaker to change. This changed impedance then forces the phase shift between the current and voltage to increase, as illustrated in FIG. 5. This configuration is then sensed 904 and when the phase shift exceeds a threshold amount 906, a tactile event is indicated 908 to the app.

If the thumb or finger is only lightly applied to the audio port, the audio port may be only partially blocked. When the thumb or finger is more strongly applied, then the finger will flatten and more fully obstruct the audio port. Several thresholds 906 may be selected to identify different amounts of finger pressure. In this manner, two or more tactile events may be indicated 908 to indicate different levels of tactile force based on the amount of phase shift detected.

As described above, there may be two or more speakers driven 902 with separate signals that are each sensed 904 separately. In this manner, separate tactile events may be indicated 908 for each speaker.

A display device may be providing a user interface for a particular game app, for example. The user interface is updated 910 in response to various tactile events indicated 908 in response to touching the speakers(s).

System Example

Figure 10:
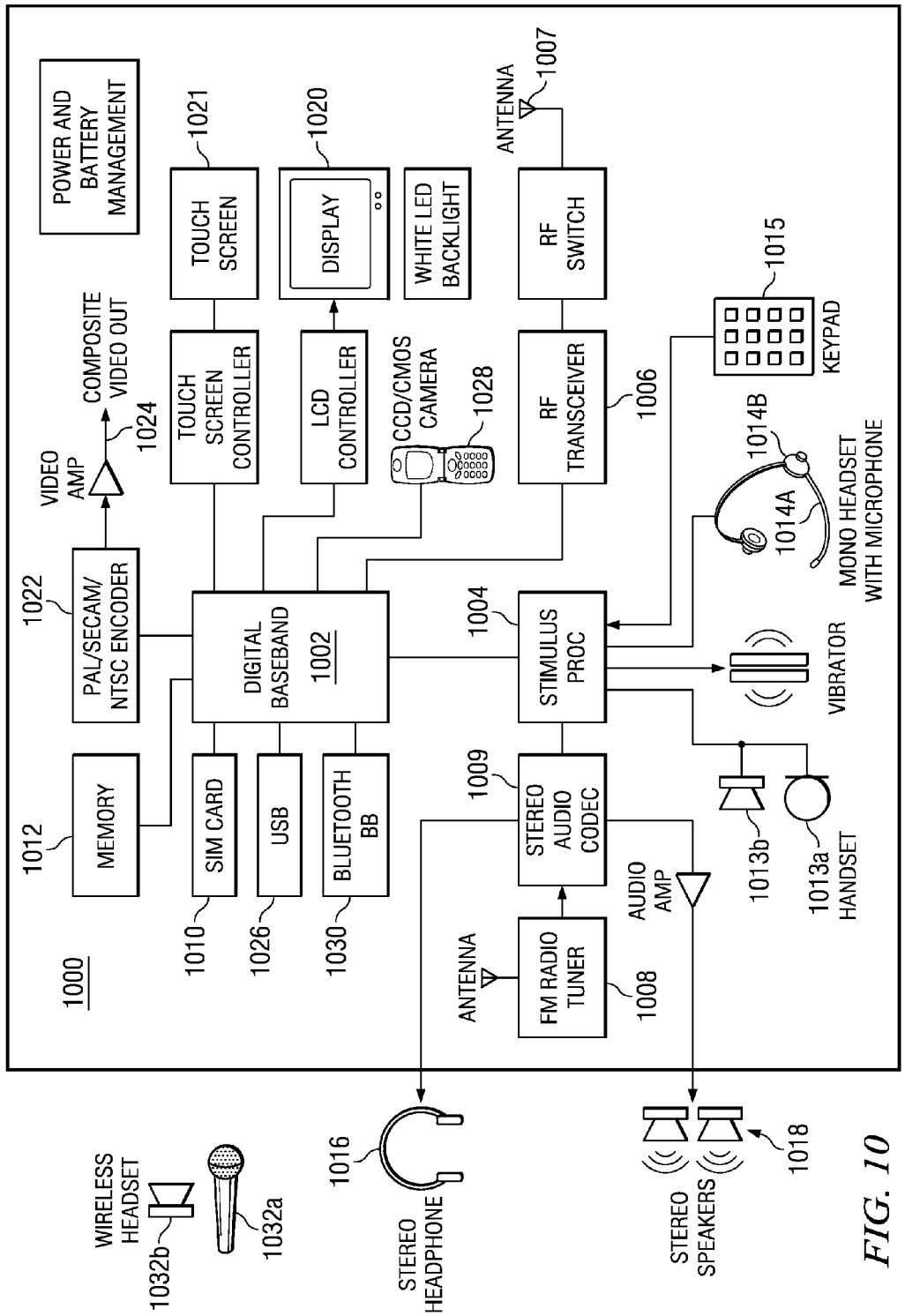
FIG. 10 is a more detailed block diagram of a cell phone that embodies a tactile interface using speakers.

FIG. 10 is a block diagram of mobile cellular phone 1000 for use in a cellular network. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1106 is a digital radio processor and includes a receiver for receiving a stream of coded data frames from a cellular base station via antenna 1107 and a transmitter for transmitting a stream of coded data frames to the cellular base station via antenna 1107. RF transceiver 1106 is connected to DBB 1102 which provides processing of the frames of encoded data being received and transmitted by cell phone 1100.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards. In some embodiments, audio codec 1109 receives an audio stream from FM Radio tuner 1108 and sends an audio stream to stereo headset 1116 and/or stereo speakers 1118. In other embodiments, there may be other sources of an audio stream, such a compact disc (CD) player, a solid state memory module, etc.

As described in more detail above, speaker 1013b, mono headset speaker 1014b, and/or stereo headphone 1016 may be used to provide tactile input to a game app or other interactive application being executed by processor 1002 from instructions stored in memory 1012. Stimulus processor 1004 may perform current/voltage phase difference detection on the speaker signals as described in more detail above.

Other Embodiments

Figure 11:
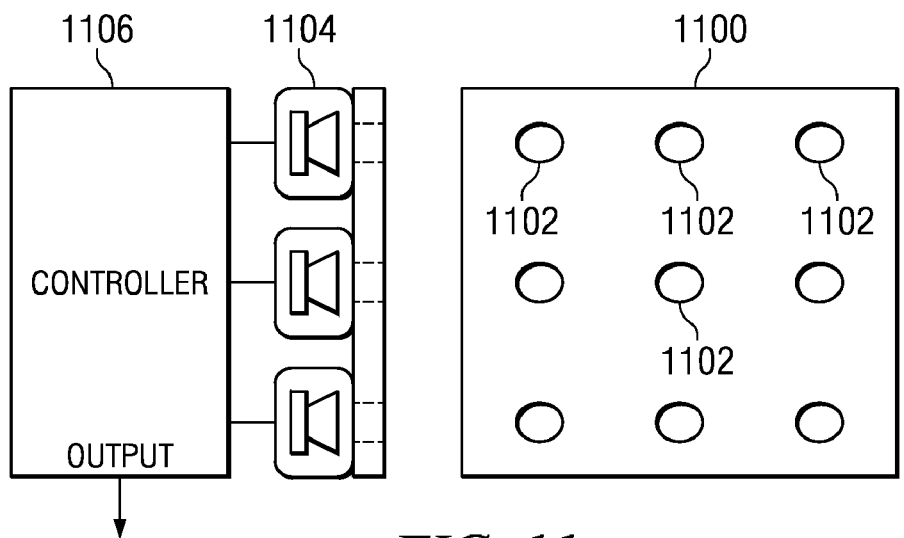
FIG. 11 is a front and side view of a keypad that includes a number of speakers for sensing tactile input.

While the invention has been described with reference to illustrative embodiments, this description is not intended to be construed in a limiting sense. Various other embodiments of the invention will be apparent to persons skilled in the art upon reference to this description. For example, FIG. 11 is a front and side view of a keypad that includes a number of speakers 1104 in enclosures with audio ports 1102 for sensing tactile input. A controller 1106 provides individual sense signals to the speakers and senses current/voltage phase shifts produced by obstructing one or more of the audio ports. In this manner, a keypad or complete keyboard may be embodied with no moving parts, other than the speakers.

While a mobile handset has been described, embodiments of the invention are not limited to cellular phone devices. Various personal devices such as audio players, video players, radios, televisions, personal digital assistants (PDA) may use an embodiment of the invention to detect tactile input for various application provided by the device.

Although the invention finds particular application to systems using Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

It is therefore contemplated that the appended claims will cover any such modifications of the embodiments as fall within the true scope and spirit of the invention.

What is claimed is:

1. A method for detecting tactile input to a system having a speaker located in an enclosure with an audio port, comprising:
   generating a sound wave by the speaker in response to a signal having a voltage phase and a current phase;
   sensing a first phase relationship between the current phase and the voltage phase when the enclosure has a first configuration;
   sensing a second phase relationship between the current phase and the voltage phase when the enclosure has a second configuration in response to being touched by a user of the system; and
   indicating a tactile event while the second phase relationship is sensed.

2. The method of claim 1, wherein in the first configuration the enclosure audio port is essentially unobstructed and in the second configuration the audio port is at least partially obstructed, whereby a user obstructs the audio port by touching it.

3. The method of claim 1, wherein the second phase relationship is a varying phase relationship, and wherein indicating a tactile event indicates an amount of pressure against the audio port, whereby tactile force is conveyed.

4. The method of claim 1, wherein the system comprises at least two or more speakers and enclosures, and wherein sensing and indicating tactile events are performed for each speaker.

5. The method of claim 1, wherein the signal is a sine wave.

6. The method of claim 1, wherein the signal comprises frequency components in the range of 600-1500 Hz.

7. The method of claim 1, wherein the signal represents a music file and wherein sensing a phase relationship comprises performing a complex-Fast Fourier Transform (FFT) on the voltage phase and on the current phase of the signal.

8. The method of claim 1, further comprising updating a user interface of the system in response to the tactile event.

9. The method of claim 8, wherein the user interface is responsive to a gaming application being executed on the system.

10. The method of claim 1, wherein the system is a cellular handset comprising phase detection circuitry coupled to the speaker.

11. The method of claim 10, wherein the speaker is located in a headset coupled to the cellular handset.

12. A system, comprising:
   a processor coupled to a memory circuit, the processor configured to execute a application program stored in the memory circuit;
   a speaker coupled to the processor, wherein the speaker is located in an enclosure with an audio port; and
   a phase detector coupled to the speaker and to the processor, the phase detector configured to detect a voltage phase and a current phase of a signal provided to the speaker, wherein the phase detector is configured to:
      sense a first phase relationship between the current phase and the voltage phase when the enclosure has a first configuration;
      sense a second phase relationship between the current phase and the voltage phase when the enclosure has a second configuration in response to being touched by a user of the system; and
      indicate a tactile event while the second phase relationship is sensed.

13. The system of claim 12, wherein in the first configuration the enclosure audio port is essentially unobstructed and in the second configuration the audio port is at least partially obstructed, whereby a user obstructs the audio port by touching it.

14. The system of claim 12, wherein the second phase relationship is a varying phase relationship, and wherein indicating a tactile event indicates an amount of pressure against the audio port, whereby tactile force is conveyed.

15. The system of claim 12, wherein the system comprises at least two or more speakers and enclosures, and wherein sensing and indicating tactile events are performed for each speaker.

16. The system of claim 12, wherein the signal comprises one or more frequency frequency components in the range of 600-1500 Hz.

17. The system of claim 12, wherein the signal represents a music file and wherein sensing a phase relationship comprises performing a complex-Fast Fourier Transform (FFT) on the voltage phase and on the current phase of the signal.

18. The system of claim 12, further comprising a display configured to display a user interface, wherein the processor is configured to update the user interface in response to the tactile event.

19. The system of claim 18, wherein the user interface is responsive to a gaming application being executed on the processor.

20. The system of claim 18, wherein the system is a cellular handset and wherein the speaker is located in a headset coupled to the cellular handset.

* * * * *